(12) United States Patent
Chen et al.

(10) Patent No.: US 12,498,592 B2
(45) Date of Patent: Dec. 16, 2025

(54) OPTICAL LENS FOR VISION CORRECTION (71) Applicant: ST. SHINE OPTICAL CO., LTD., New Taipei (TW)

(72) Inventors: Ming-Hsien Chen, New Taipei (TW); Yu-Jan Chou, New Taipei (TW); Chin-Hsien Tsan, New Taipei (TW)

(73) Assignee: ST. SHINE OPTICAL CO., LTD., New Taipei (TW)

( * ) Notice: Subject to any disclaimer, the term of this patent is extended or adjusted under 35 U.S.C. 154(b) by 333 days.

(21) Appl. No.: 18/455,861

(22) Filed: Aug. 25, 2023

(65) Prior Publication Data
US 2024/0319521 A1 Sep. 26, 2024

(30) Foreign Application Priority Data
Mar. 21, 2023 (TW) .................. 112110486

(51) Int. Cl.
*G02C 7/06* (2006.01)
(52) U.S. Cl.
CPC .................. *G02C 7/061* (2013.01)
(58) Field of Classification Search
CPC .......... G02C 7/061; G02C 7/04; G02C 7/024; G02C 2202/24
USPC ..................... 351/159.42, 159.41, 159.43
See application file for complete search history.

(56) References Cited

U.S. PATENT DOCUMENTS

| | | | |
|---|---|---|---|
| 2001/0033363 A1* | 10/2001 | Chateau | G02C 7/042 351/216 |
| 2015/0055081 A1* | 2/2015 | de Juan, Jr. | G02C 7/049 351/159.04 |
| 2019/0317337 A1* | 10/2019 | Sawada | G02C 7/04 |
| 2020/0253719 A1* | 8/2020 | Liang | A61F 2/1648 |
| 2021/0191153 A1* | 6/2021 | Borja | G02C 7/042 |
| 2022/0047384 A1* | 2/2022 | Canovas Vidal | A61F 2/1637 |

* cited by examiner

*Primary Examiner* — William R Alexander
(74) *Attorney, Agent, or Firm* — Burris Law, PLLC (57) ABSTRACT

An optical lens for vision correction adapted to correct a diopter value of N of an eye of a subject includes a vision correction area. The vision correction area includes an optical center, a first diopter correction portion, and a second diopter correction portion. The optical center is for aligning with a visual axis of the eye of the subject. The first diopter correction portion outwardly extends from the optical center and has a diopter value gradually decreasing from the optical center to a periphery of the first diopter correction portion. The optical center has a maximum diopter value ranging from N+3.5 D to N+9 D. The periphery of the first diopter correction portion has a diopter value of N. The second diopter correction portion surrounds and adjoins the first diopter correction portion, and has a diopter value constantly varying within a range from N−1.5 D to N+1 D.

5 Claims, 13 Drawing Sheets

OPTICAL LENS FOR VISION CORRECTION

CROSS-REFERENCE TO RELATED APPLICATION

This application claims priority to Taiwanese Invention Patent Application No. 112110486, filed on Mar. 21, 2023, which is incorporated herein by reference in its entirety.

FIELD

The disclosure relates to an optical lens, and more particularly to an optical lens for vision correction.

BACKGROUND

Currently, for a commercially available contact lens, an amount of energy and light involved in focusing images on retina is merely a part of the total amount of light entering an eye, i.e., less than 70%. As a result, under dim light, visual acuity of a wearer of the contact lens may be affected.

In addition, when light passes subsequently through the contact lens and eyes of the wearer, the light may be reflected, absorbed, or transmitted when crossing through the eyes so that regular and irregular optical waves may be generated and a deviation of an actual wavefront from a desired wavefront may occur, thereby leading to an aberration. When viewing objects at various distances, the ciliary muscle of the eyes is there to regulate accommodation of the eyes by changing the focal distance of the crystalline lens so as to overcome the aberration and the dim light, thereby making an image seen by the wearer of the contact lens more distinct. However, the forgoing circumstances may impose certain burden to the eyes.

SUMMARY

Therefore, an object of the disclosure is to provide an optical lens for vision correction that can alleviate at least one of the drawbacks of the prior art.

According to the disclosure, the optical lens for vision correction, adapted to correct a diopter value of N of an eye of a subject includes a vision correction area including an optical center, a first diopter correction portion, and a second diopter correction portion. The optical center is for aligning with a visual axis of the eye of the subject. The first diopter correction portion outwardly extends from the optical center, has a radius ranging from 0.25 mm to 1.25 mm taking the optical center as a center of circle, and has a diopter value gradually decreasing from the optical center to a periphery of the first diopter correction portion. The optical center has a maximum diopter value ranging from N+3.5 D to N+9 D, and the periphery of the first diopter correction portion has a diopter value of N. The second diopter correction portion surrounds and adjoins the first diopter correction portion, has a radius ranging from 0.5 mm to 2.25 mm taking the optical center as a center of circle, and has a diopter value constantly varying within a range from N−1.5 D to N+1 D.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

The present disclosure provides an optical lens for vision correction, which is adapted to correct a diopter value of N of an eye 9 of a subject, where N, the diopter value of the eye 9 of the subject, may be a positive number or a negative number. Those skilled in the art can realize that if N is a positive number, it indicates hyperopia; if N is a negative number, it indicates myopia.

Figure 1:
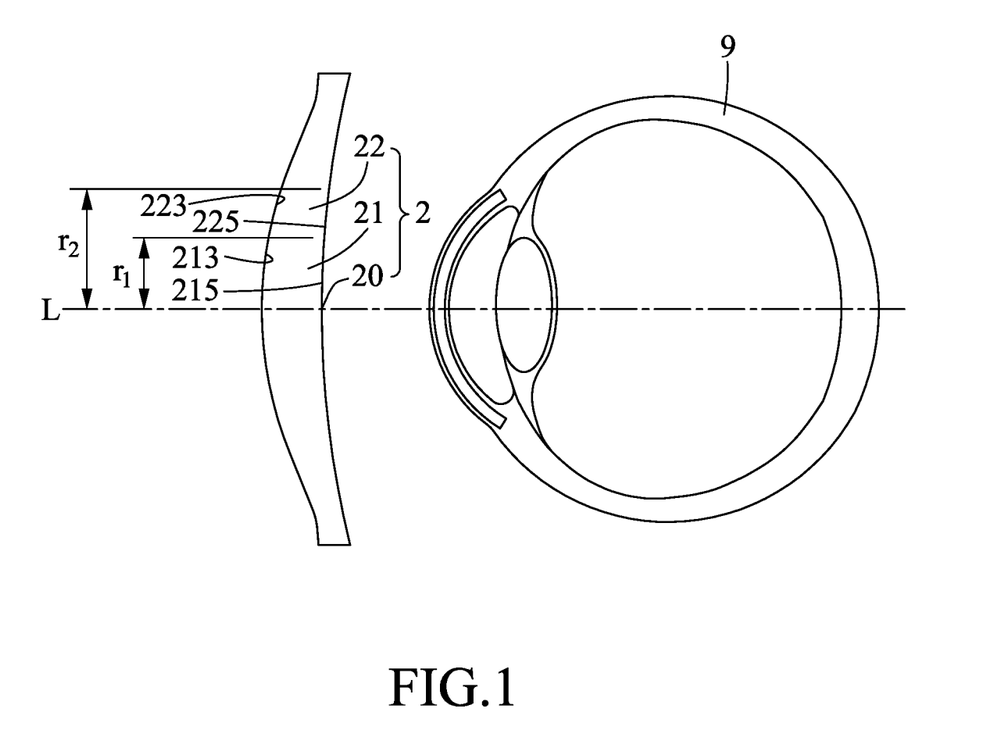
FIG. 1 is a schematic view illustrating an embodiment of an optical lens for vision correction according to the present disclosure.

Referring to FIG. 1, the optical lens for vision correction of the present disclosure includes a vision correction area 2 which includes an optical center 20 for aligning with a visual axis (L) of the eye 9 of the subject, a first diopter correction portion 21 outwardly extending from the optical center 20 to form a circle, and a second diopter correction portion 22 surrounding and adjoining the first diopter correction portion 21. That is to say, the first diopter correction portion 21 and the second diopter correction portion 22 are two concentric circles having the optical center 20 as a center of circle.

In addition, the first diopter correction portion 21 has a radius (r1) ranging from 0.25 mm to 1.25 mm taking the optical center 20 as a center of circle, and has a diopter value gradually decreasing from the optical center 20 to a periphery of the first diopter correction portion 21. The optical center 20 has a maximum diopter value ranging from N+3.5 D to N+9 D, and the periphery of the first diopter correction portion 21 has a diopter value of N. In certain embodiments, the optical lens is a concave lens for correcting myopia, and the maximum diopter value of the optical center 20 of the optical lens ranges from N+3.5 D to N+6 D. In other embodiments, the optical lens is a convex lens for correcting hyperopia, and the maximum diopter value of the optical center 20 of the optical lens ranges from N+5 D to N+9 D.

The second diopter correction portion 22 has a radius (r2) ranging from 0.5 mm to 2.25 mm taking the optical center 20 as a center of circle, and has a diopter value constantly varying within a range from N−1.5 D to N+1 D. That is to say, the diopter value of the second diopter correction portion 22 is not a fixed value but changes invariably in the range from N−1.5 D to N+1 D.

In an exemplary embodiment, the optical lens for vision correction is adapted to correct a diopter value of −3 D of an eye of a subject. In such embodiment, the optical center 20 of the optical lens may have the maximum diopter value ranging from 0.5 D to 6 D, and the periphery of the first diopter correction portion 21 of the optical lens may have the diopter value of −3 D. Moreover, the second diopter correction portion 22 has the diopter value constantly varying within a range from −4.5 D to −2 D.

The diopter distribution in each of the first diopter correction portion 21 and the second diopter correction portion 22 may be regulated by adjusting at least one of a radius of curvature of a front arc portion 213, 223 thereof, a radius of curvature of a back arc portion 215, 225 thereof, and a refractive index of a material from which the optical lens is made. In certain embodiments, the front arc portion 213 of the first diopter correction portion 21 has a radius of curvature smaller than that of the front arc portion 223 of the second diopter correction portion 22. Moreover, the radius of curvature of the front arc portion 213, 223 of each of the first diopter correction portion 21 and the second diopter correction portion 22 may be adjusted as desired with respect to a diopter value of an eye of a subject. The smaller the radius of curvature of the front arc portion 213, 223, the greater the diopter value of the optical lens. On the contrary, the greater the radius of curvature of the front arc portion 213, 223, the smaller the diopter value of the optical lens. In some embodiments, the optical lens has a refractive index ranging from 1.38 to 1.42.

Figure 2:
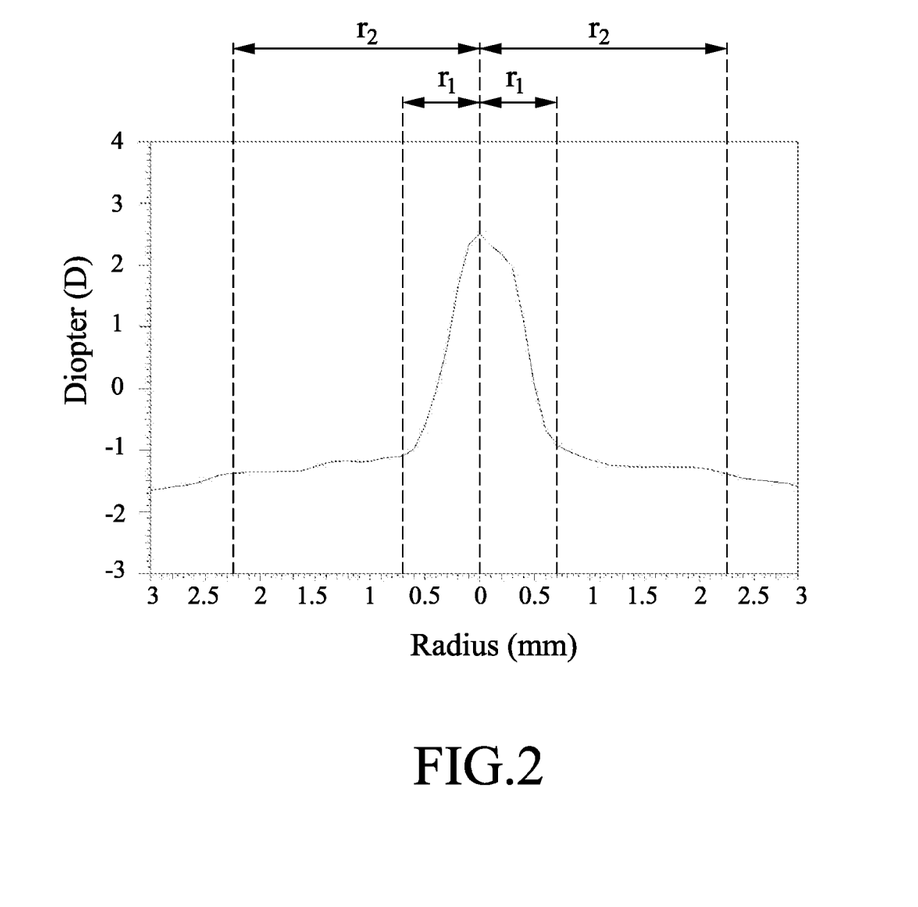
FIG. 2 is a line graph illustrating the diopter distribution of a first diopter correction portion and a second diopter correction portion of an Example 1 of the optical lens for vision correction according to the present disclosure.
Figure 3:
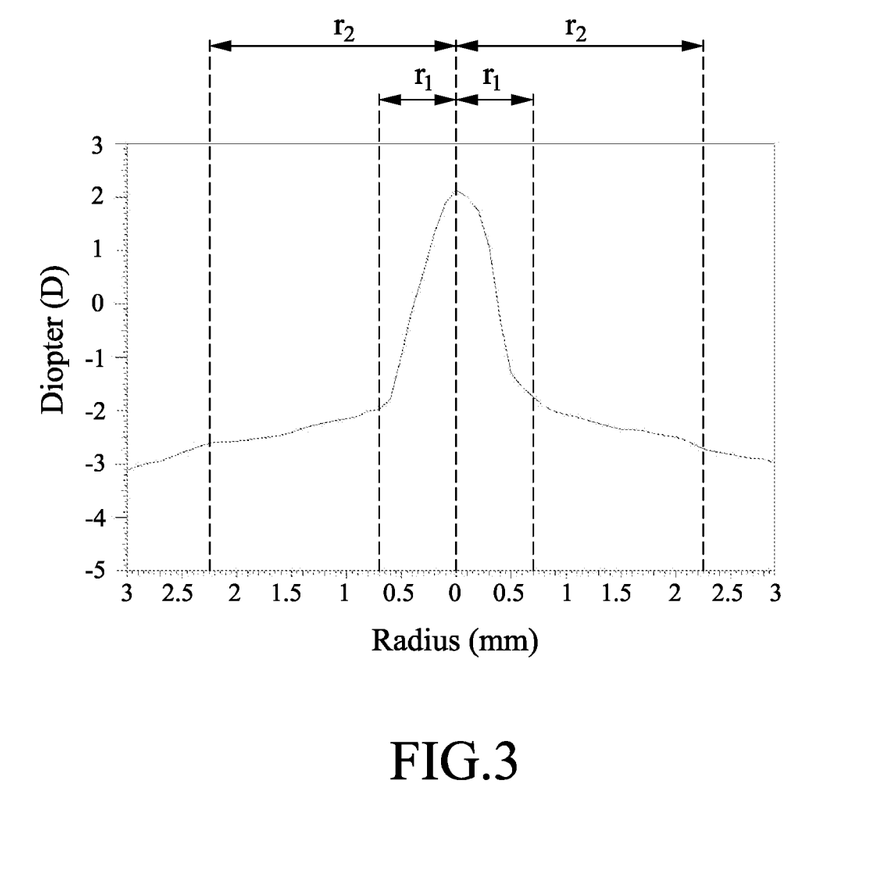
FIG. 3 is a line graph illustrating the diopter distribution of a first diopter correction portion and a second diopter correction portion of an Example 2 of the optical lens for vision correction according to the present disclosure.
Figure 4:
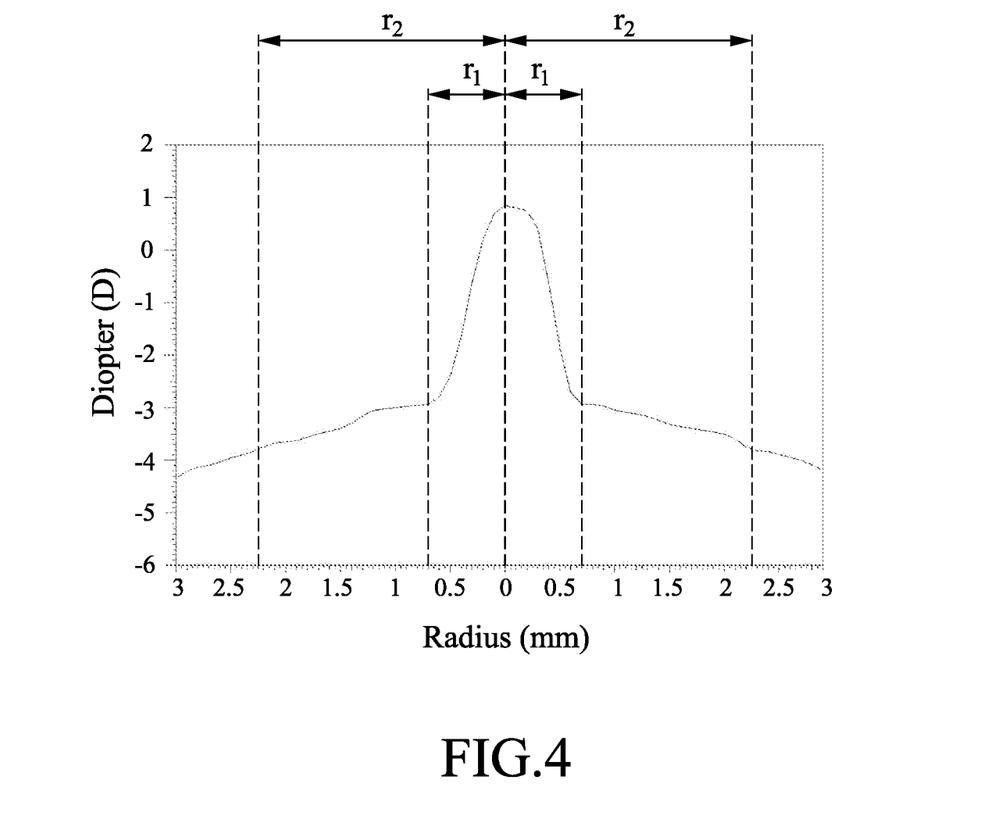
FIG. 4 is a line graph illustrating the diopter distribution of a first diopter correction portion and a second diopter correction portion of an Example 3 of the optical lens for vision correction according to the present disclosure.
Figure 5:
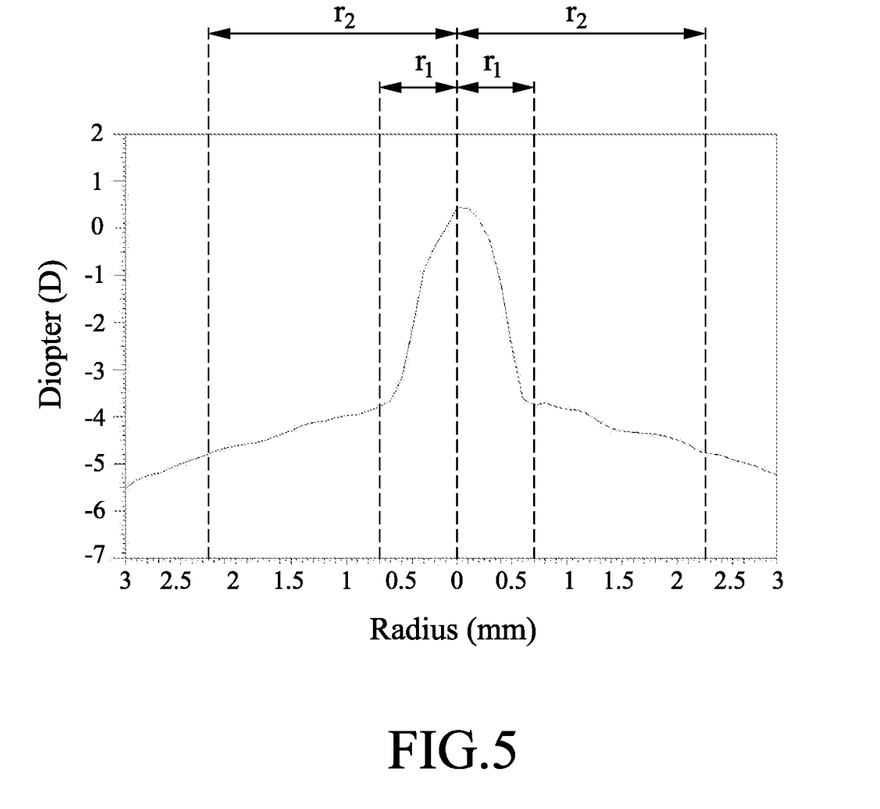
FIG. 5 is a line graph illustrating the diopter distribution of a first diopter correction portion and a second diopter correction portion of an Example 4 of the optical lens for vision correction according to the present disclosure.
Figure 6:
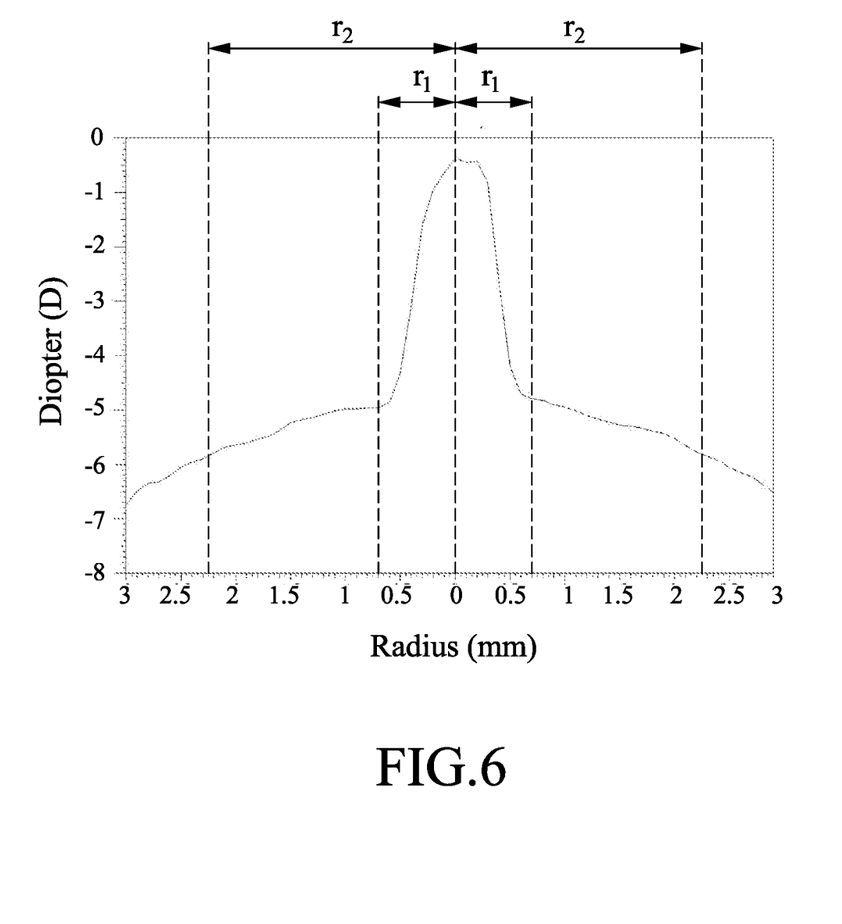
FIG. 6 is a line graph illustrating the diopter distribution of a first diopter correction portion and a second diopter correction portion of an Example 5 of the optical lens for vision correction according to the present disclosure.
Figure 7:
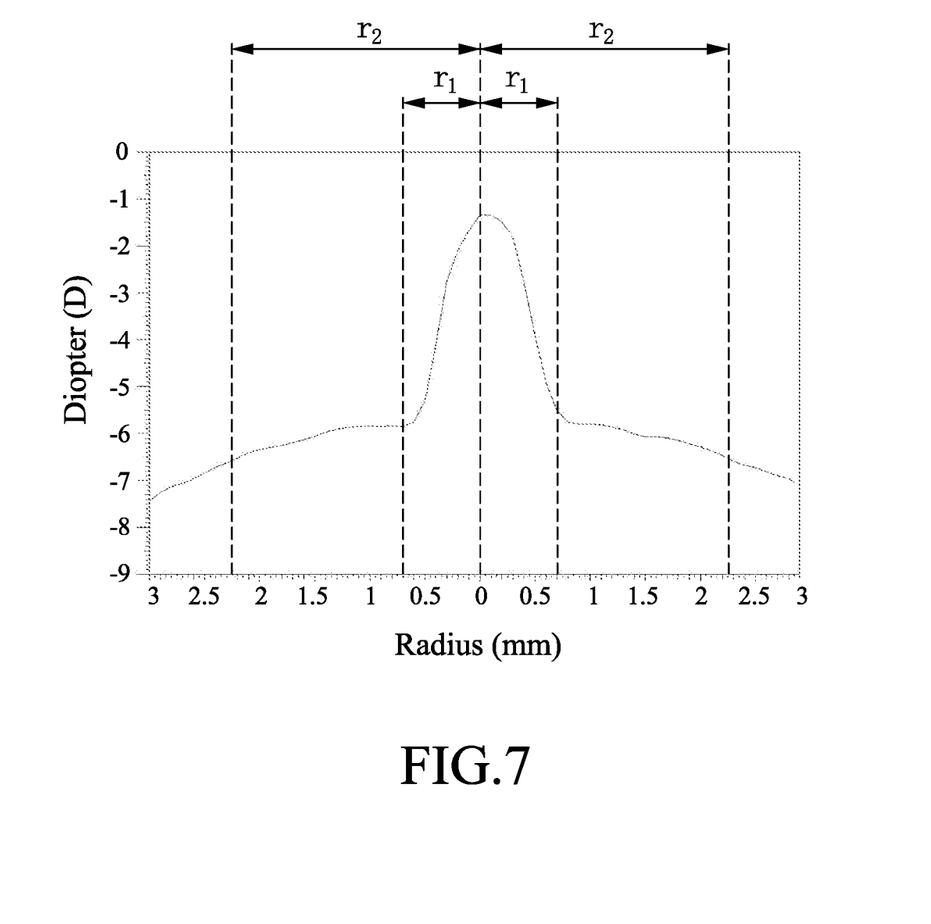
FIG. 7 is a line graph illustrating the diopter distribution of a first diopter correction portion and a second diopter correction portion of an Example 6 of the optical lens for vision correction according to the present disclosure.
Figure 8:
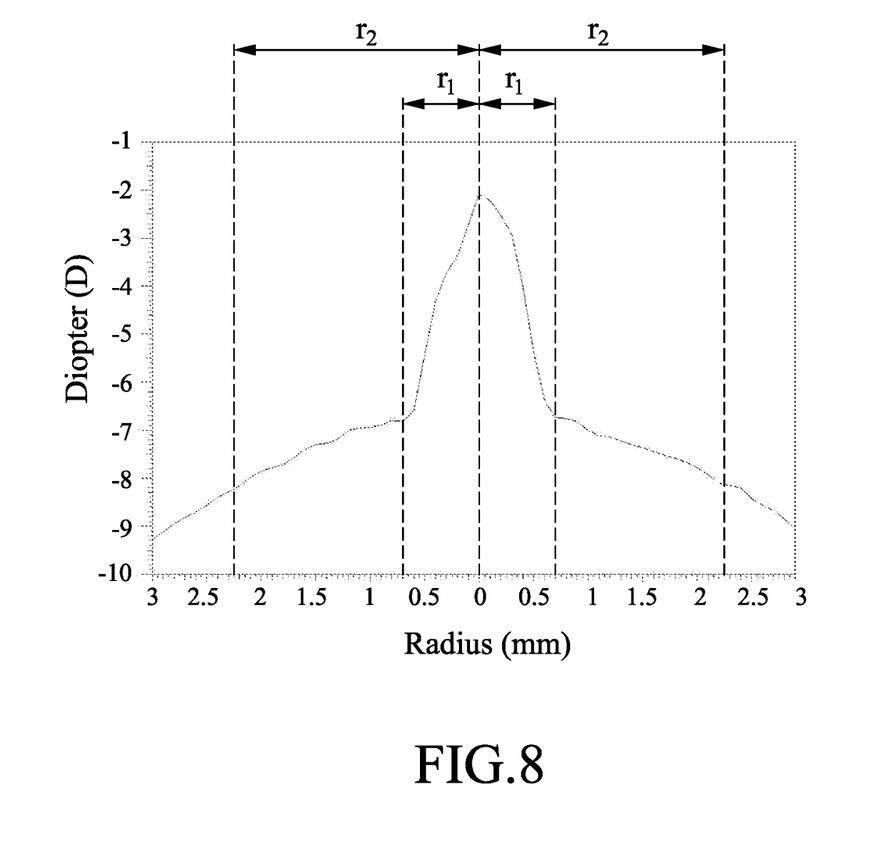
FIG. 8 is a line graph illustrating the diopter distribution of a first diopter correction portion and a second diopter correction portion of an Example 7 of the optical lens for vision correction according to the present disclosure.
Figure 9:
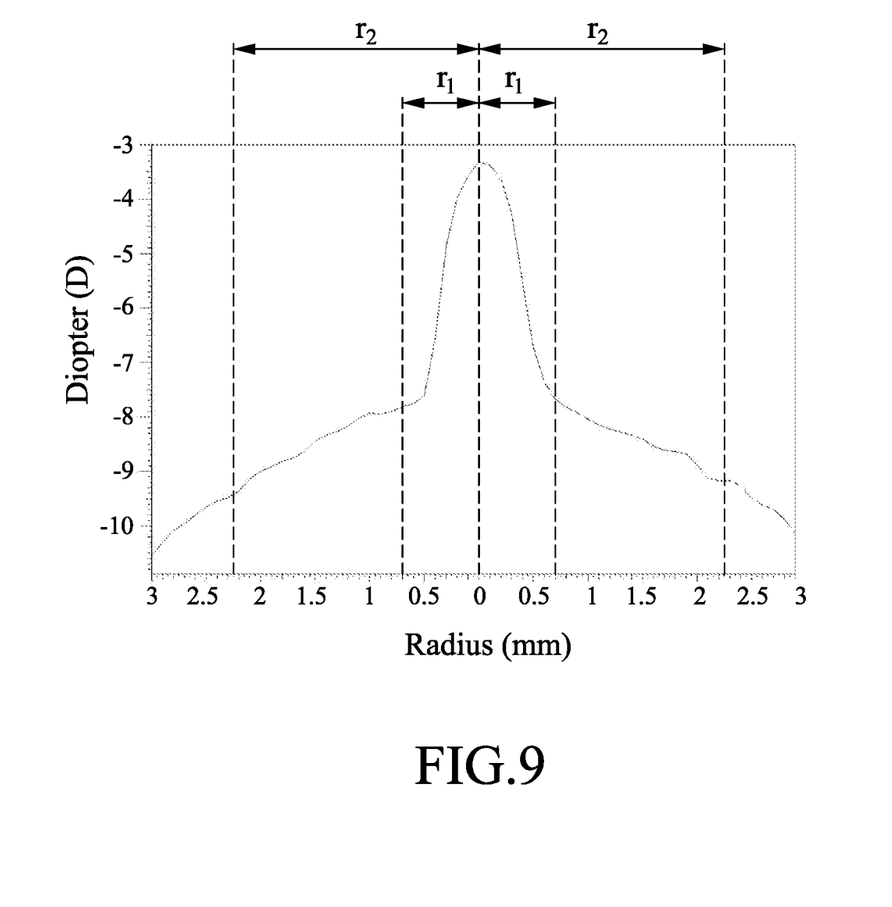
FIG. 9 is a line graph illustrating the diopter distribution of a first diopter correction portion and a second diopter correction portion of an Example 8 of the optical lens for vision correction according to the present disclosure.
Figure 10:
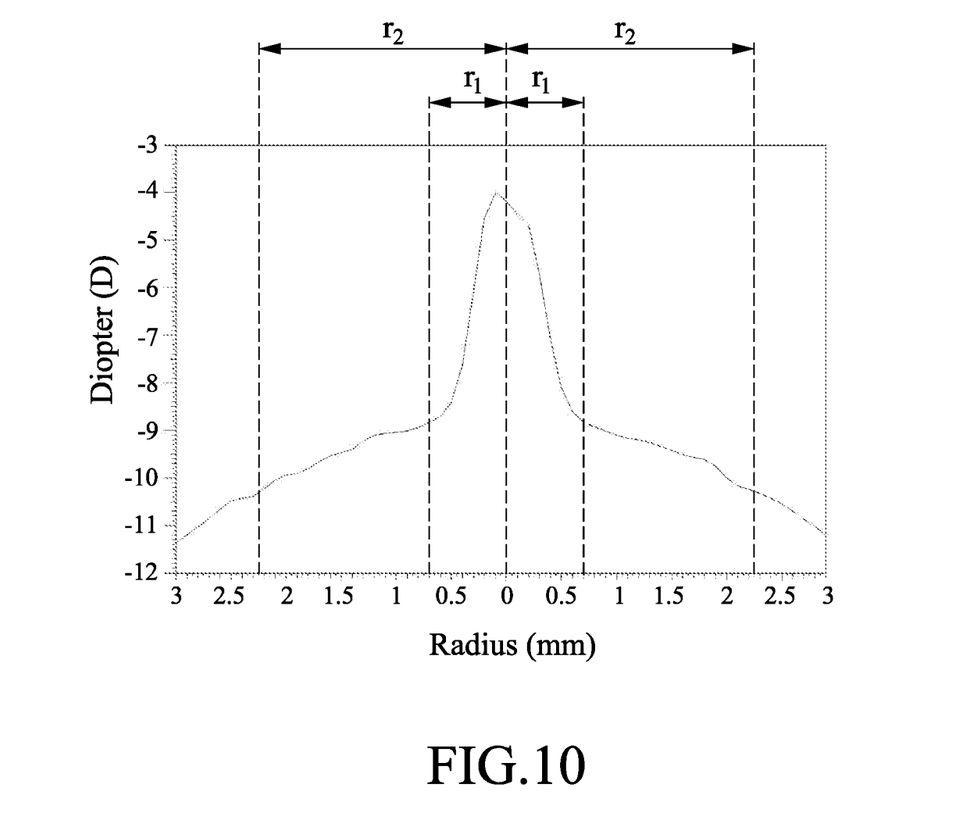
FIG. 10 is a line graph illustrating the diopter distribution of a first diopter correction portion and a second diopter correction portion of an Example 9 of the optical lens for vision correction according to the present disclosure.
Figure 11:
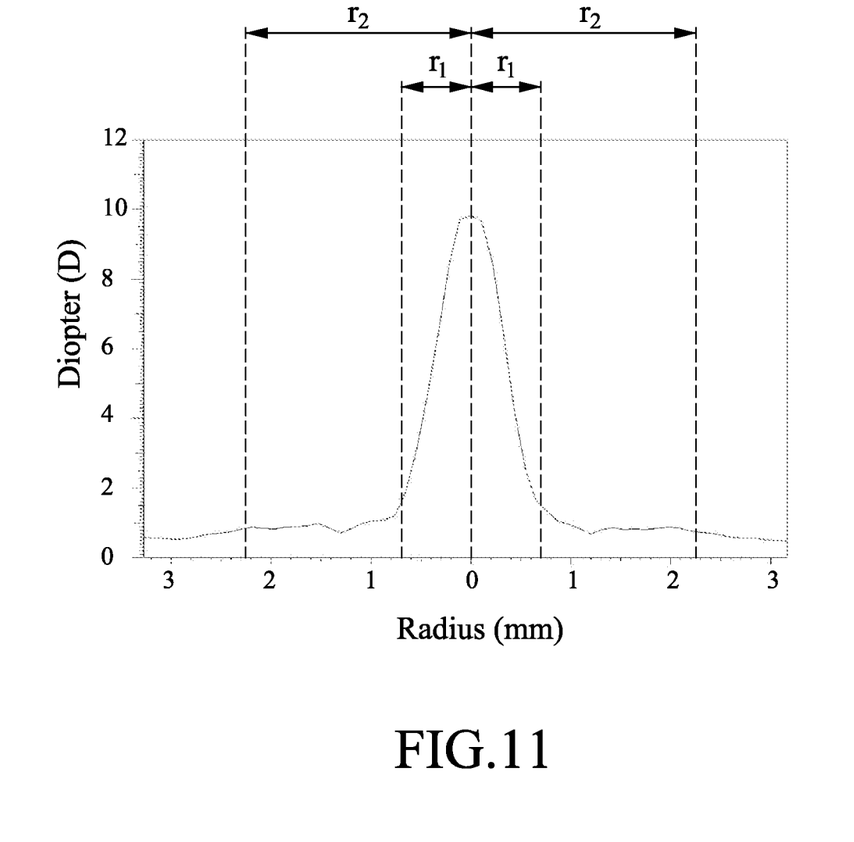
FIG. 11 is a line graph illustrating the diopter distribution of a first diopter correction portion and a second diopter correction portion of an Example 10 of the optical lens for vision correction according to the present disclosure.
Figure 12:
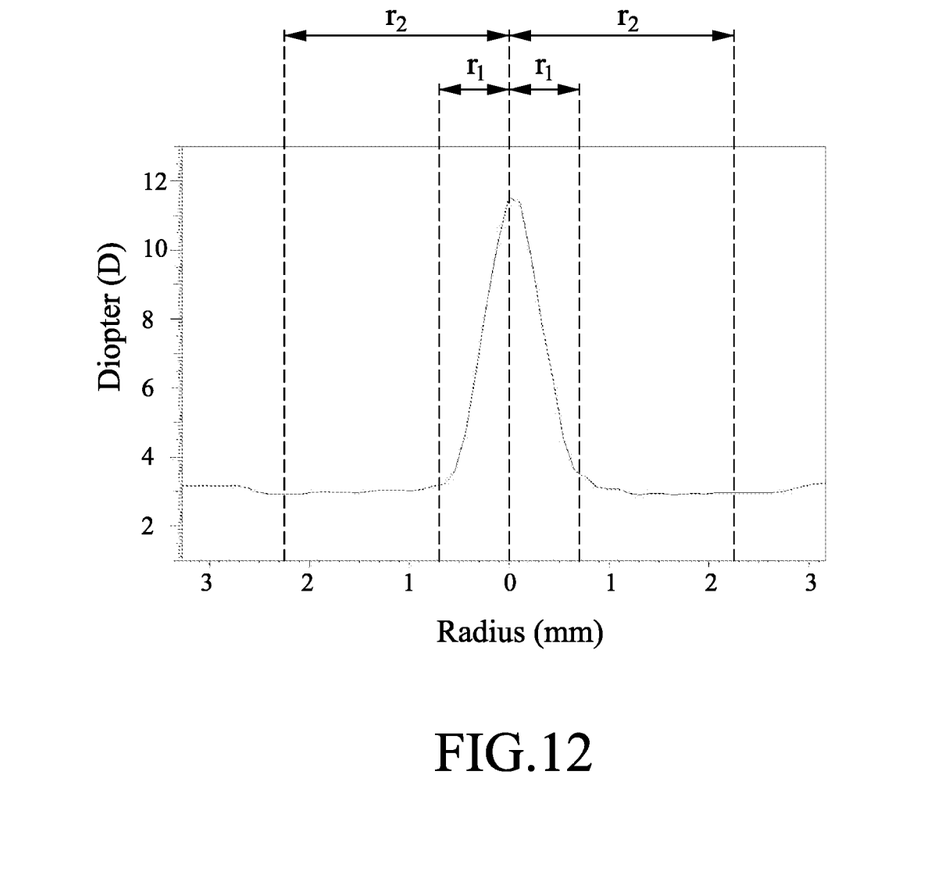
FIG. 12 is a line graph illustrating the diopter distribution of a first diopter correction portion and a second diopter correction portion of an Example 11 of the optical lens for vision correction according to the present disclosure.
Figure 13:
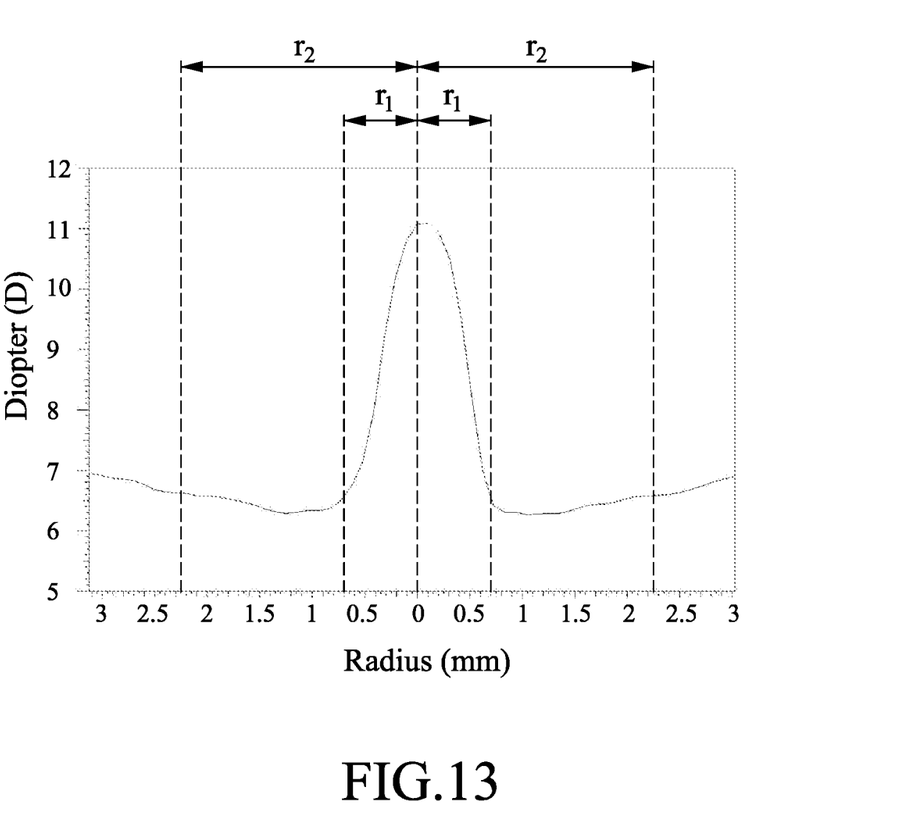
FIG. 13 is a line graph illustrating the diopter distribution of a first diopter correction portion and a second diopter correction portion of an Example 12 of the optical lens for vision correction according to the present disclosure.

Tables 1 and 2, and FIGS. 2 to 13 show the configuration of the diopter distribution in each of the first diopter correction portion 21 and the second diopter correction portion 22 of optical lenses of Examples 1 to 12 according to the present disclosure in correspondence with a different diopter value of an eye of a subject. The optical lens of each of Examples 1 to 9 (as shown respectively in FIGS. 2 to 10) is a concave lens for correcting myopia. In addition, the optical lens of each of Examples 10 to 12 (as shown respectively in FIGS. 11 to 13) is a convex lens for correcting hyperopia. As shown in FIG. 2, the optical lens of Examples 1 is adapted to correct a diopter value of −1.00 D of an eye of a subject, and in FIG. 3, the optical lens of Examples 2 is adapted to correct a diopter value of −2.00 D of an eye of a subject. In FIG. 4, the optical lens of Examples 3 is adapted to correct a diopter value of −3.00 D of an eye of a subject, and in FIG. 5, the optical lens of Examples 4 is adapted to correct a diaper value of −4.00 D of an eye of a subject. In FIG. 6, the optical lens of Examples 5 is adapted to correct a diopter value of −5.00 D of an eye of a subject, and in FIG. 7, the optical lens of Examples 6 is adapted to correct a diopter value of −6.00 D of an eye of a subject. In FIG. 8, the optical lens of Examples 7 is adapted to correct a diopter value of −7.00 D of an eye of a subject, and in FIG. 9, the optical lens of Examples 8 is adapted to correct a diopter value of −8.00 D of an eye of a subject. In FIG. 10, the optical lens of Examples 9 is adapted to correct a diopter value of −9.00 D of an eye of a subject. In addition, in FIG. 11, the optical lens of Examples 10 is adapted to correct a diopter value of +1.00 D of an eye of a subject, and in FIG. 12, the optical lens of Examples 11 is adapted to correct a diopter value of +3.00 D of an eye of a subject. Finally, in FIG. 13, the optical lens of Examples 12 is adapted to correct a diopter value of +6.00 D of an eye of a subject. In each of Examples 1 to 12, the radius (r1) of the first diopter correction portion 21 of the optical lens is 0.7 mm, and the radius (r2) of the second diopter correction portion 22 of the optical lens is 2.25 mm. More information regarding the first diopter correction portion 21 and the second diopter correction portion 22 is shown in Tables 1 and 2 below. In Tables 1 and 2, the refractive index, the radius of curvature of the front arc portion, the radios of curvature of the back arc portion, the maximum diopter value, and the minimum diopter value were obtained using an optical analysis instrument (Model: SHSOphthalmic cito, OPTOCRAFT GmbH).

TABLE 1

| | | | First diopter correction portion | | | |
|---|---|---|---|---|---|---|
| Example | Diopter value of an eye of a subject (D) | Refractive index | Radius of curvature of front arc portion (mm) | Radius of curvature of back arc portion (mm) | Maximum diopter value (D) | Difference between maximum diopter value and diopter value of an eye of a subject (D) |
| 1 | −1.00 | 1.418 | 6.8797 | 6.7442 | 2.50 | 3.50 |
| 2 | −2.00 | 1.418 | 6.9385 | 6.7442 | 2.12 | 4.12 |
| 3 | −3.00 | 1.418 | 7.1575 | 6.7442 | 0.84 | 3.84 |
| 4 | −4.00 | 1.418 | 7.3216 | 6.7442 | 0.43 | 4.43 |
| 5 | −5.00 | 1.418 | 7.5435 | 6.7442 | −0.37 | 4.63 |
| 6 | −6.00 | 1.418 | 7.7111 | 6.7442 | −1.34 | 4.66 |
| 7 | −7.00 | 1.418 | 7.8513 | 6.7442 | −2.07 | 4.93 |
| 8 | −8.00 | 1.418 | 7.9211 | 6.7442 | −3.31 | 4.69 |
| 9 | −9.00 | 1.418 | 8.1255 | 6.7442 | −3.99 | 5.01 |
| 10 | +1.00 | 1.418 | 6.5200 | 6.7442 | 9.82 | 8.82 |
| 11 | +3.00 | 1.418 | 6.3104 | 6.7442 | 11.53 | 8.53 |
| 12 | +6.00 | 1.418 | 6.1380 | 6.7442 | 11.08 | 5.08 |

TABLE 2

| | Second diopter correction portion | | |
|---|---|---|---|
| Example | Radius of curvature of front arc portion (mm) | Radius of curvature of back arc portion (mm) | Minimum diopter value (D) |
| 1 | 6.9732 | 6.7442 | −1.45 |
| 2 | 7.0182 | 6.7442 | −2.70 |
| 3 | 7.1886 | 6.7442 | −3.70 |
| 4 | 7.3864 | 6.7442 | −4.80 |
| 5 | 7.6815 | 6.7442 | −5.85 |
| 6 | 7.8618 | 6.7442 | −6.50 |
| 7 | 7.9436 | 6.7442 | −8.25 |
| 8 | 8.1056 | 6.7442 | −9.45 |
| 9 | 8.2135 | 6.7442 | −10.30 |
| 10 | 6.6985 | 6.7442 | 0.85 |
| 11 | 6.5595 | 6.7442 | 2.90 |
| 12 | 6.4999 | 6.7442 | 6.65 |

By such configuration of the diopter distribution in the first diopter correction portion 21 and second diopter correction portion 22 of the optical lens according to the present disclosure, the circle of confusion of the optical lens could be reduced so that the degree of aberration of the optical lens is thus diminished, thereby deepening the depth of focus as well as extending depth of view of the optical lens. As a result, an extension of the depth of view may be attained. Accordingly, the optical lens for vision correction according to the present disclosure may yield stable images with sharp edges under any light conditions, and therefore the purpose of the present disclosure is achieved.

Through the abovementioned diopter distribution design, which may lessen the degree of aberration and therefore diminish the circle of confusion of the optical lens, the depth of focus of the optical lens may be deeper, thereby extending depth of view. In this way, when wearing the optical lens for vision correction, a patient can evade problems caused by a conventional lens, such as poor ability in coping with dim light and the occurrence of aberration, to an extent as much as possible, thus improving adaptability after correction.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optical lens for vision correction adapted to correct a diopter value of N of an eye of a subject, comprising:
   a vision correction area including
      an optical center for aligning with a visual axis of the eye of the subject;
      a first diopter correction portion outwardly extending from said optical center, having a radius ranging from 0.25 mm to 1.25 mm taking said optical center as a center of circle, and having a diopter value gradually decreasing from said optical center to a periphery of said first diopter correction portion, said optical center having a maximum diopter value ranging from N+3.5 D to N+9 D, said periphery of said first diopter correction portion having a diopter value of N; and a second diopter correction portion surrounding and adjoining said first diopter correction portion, having a radius ranging from 0.5 mm to 2.25 mm taking said optical center as a center of circle, and having a diopter value constantly varying within a range from N−1.5 D to N+1 D.

2. The optical lens for vision correction as claimed in claim 1, wherein said optical lens has a refractive index ranging from 1.38 to 1.42.

3. The optical lens for vision correction as claimed in claim 1, wherein each of said first diopter correction portion and said second diopter correction portion has a front arc portion, said front arc portion of said first diopter correction portion having a radius of curvature smaller than that of said front arc portion of said second diopter correction portion.

4. The optical lens for vision correction as claimed in claim 1, wherein said optical lens is a concave lens, said optical center having a maximum diopter value ranging from N+3.5 D to N+6 D.

5. The optical lens for vision correction as claimed in claim 1, wherein said optical lens is a convex lens, said optical center having a maximum diopter value ranging from N+5 D to N+9 D.

* * * * *